(12) United States Patent
Labadie

(10) Patent No.: US 10,472,004 B1
(45) Date of Patent: Nov. 12, 2019

(54) BI-DIRECTIONAL SPOILER

(71) Applicant: Zoox, Inc., Menlo Park, CA (US)

(72) Inventor: Christopher William Labadie, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 57 days.

(21) Appl. No.: 15/897,784

(22) Filed: Feb. 15, 2018

Related U.S. Application Data

(60) Provisional application No. 62/625,781, filed on Feb. 2, 2018.

(51) Int. Cl.
*B62D 35/00* (2006.01)

(52) U.S. Cl.
CPC .......... *B62D 35/005* (2013.01); *B62D 35/007* (2013.01)

(58) Field of Classification Search
CPC .................. B62D 35/005; B62D 35/007
See application file for complete search history.

(56) References Cited

U.S. PATENT DOCUMENTS

| | | | | |
|---|---|---|---|---|
| 9,278,719 | B2* | 3/2016 | Zhu | B62D 35/02 |
| 2008/0116716 | A1* | 5/2008 | O'Grady | B62D 35/001 |
| | | | | 296/180.4 |
| 2010/0127125 | A1* | 5/2010 | Li | B21B 1/227 |
| | | | | 244/119 |
| 2010/0282909 | A1* | 11/2010 | Rawlings | B32B 15/06 |
| | | | | 244/130 |
| 2012/0056428 | A1* | 3/2012 | Bennett | F03D 9/00 |
| | | | | 290/44 |
| 2015/0232138 | A1* | 8/2015 | Parry-Williams | B62D 37/02 |
| | | | | 296/180.5 |

* cited by examiner

*Primary Examiner* — Lori L Lyjak
(74) *Attorney, Agent, or Firm* — Lee & Hayes, P.C.

(57) ABSTRACT

A spoiler for a bi-directional vehicle may decrease the drag coefficient for the vehicle regardless of a direction of travel of the vehicle. When the vehicle spoiler is located proximate a leading end of a vehicle, the spoiler may promote laminar attached airflow. In contrast, when the vehicle spoiler is located proximate a trailing end of the vehicle, the spoiler may promote detachment of airflow from the vehicle body.

20 Claims, 7 Drawing Sheets

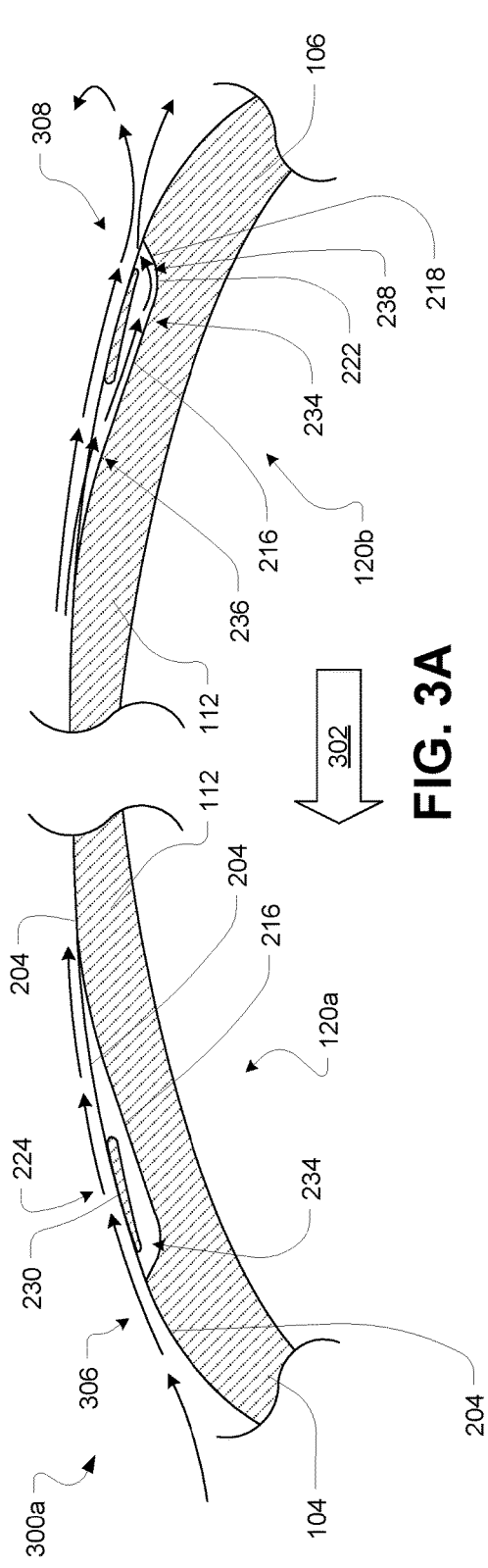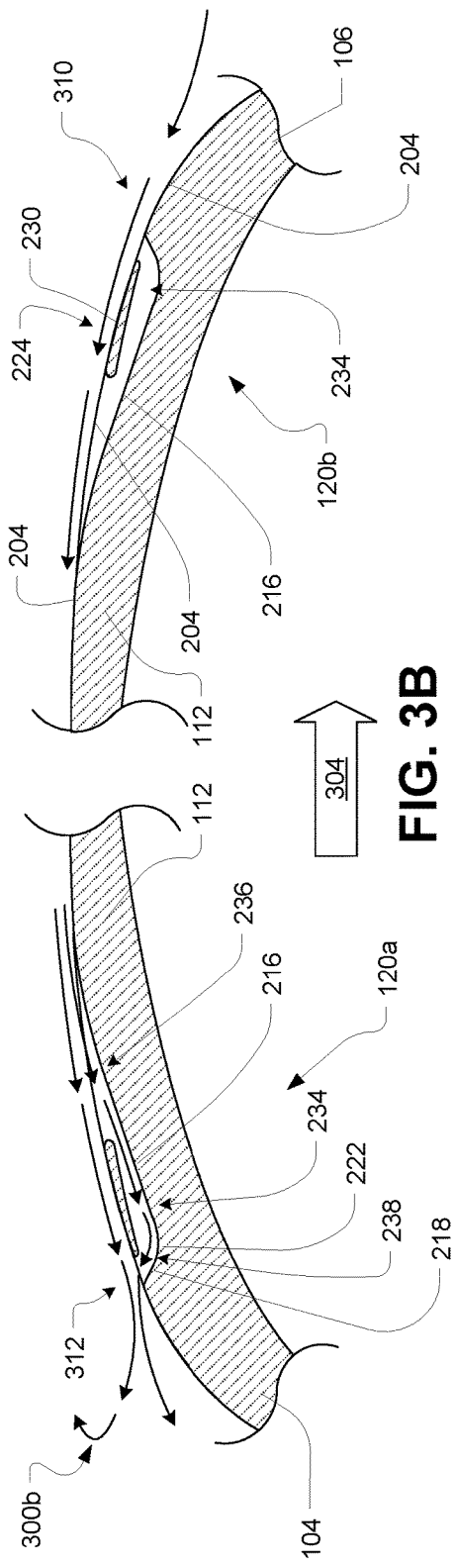

BI-DIRECTIONAL SPOILER

RELATED APPLICATIONS

This application claims priority to U.S. Provisional Application No. 62/625,781, filed Feb. 2, 2018, which is incorporated herein by reference.

BACKGROUND

A vehicle's shape has a direct impact on the aerodynamics of the vehicle. Conventional vehicles are generally configured to have a defined front end and a defined rear end, with the front end being the leading end during normal travel. It follows, then, that the shapes of the front end and the rear end of the vehicle are often optimized for leading and trailing, respectively. For example, the front end may be shaped to promote laminar airflow along the vehicle body, whereas the rear end may be shaped to promote detachment of the same airflow from the vehicle body, e.g., via a spoiler.

BRIEF DESCRIPTION OF THE DRAWINGS

FIGS. 3A and 3B are example scenarios showing airflow characteristics for the vehicle shown in FIG. 1 when the vehicle travels in a first direction and when the vehicle travels in an opposite, second direction, respectively.

DETAILED DESCRIPTION

Figure 1:
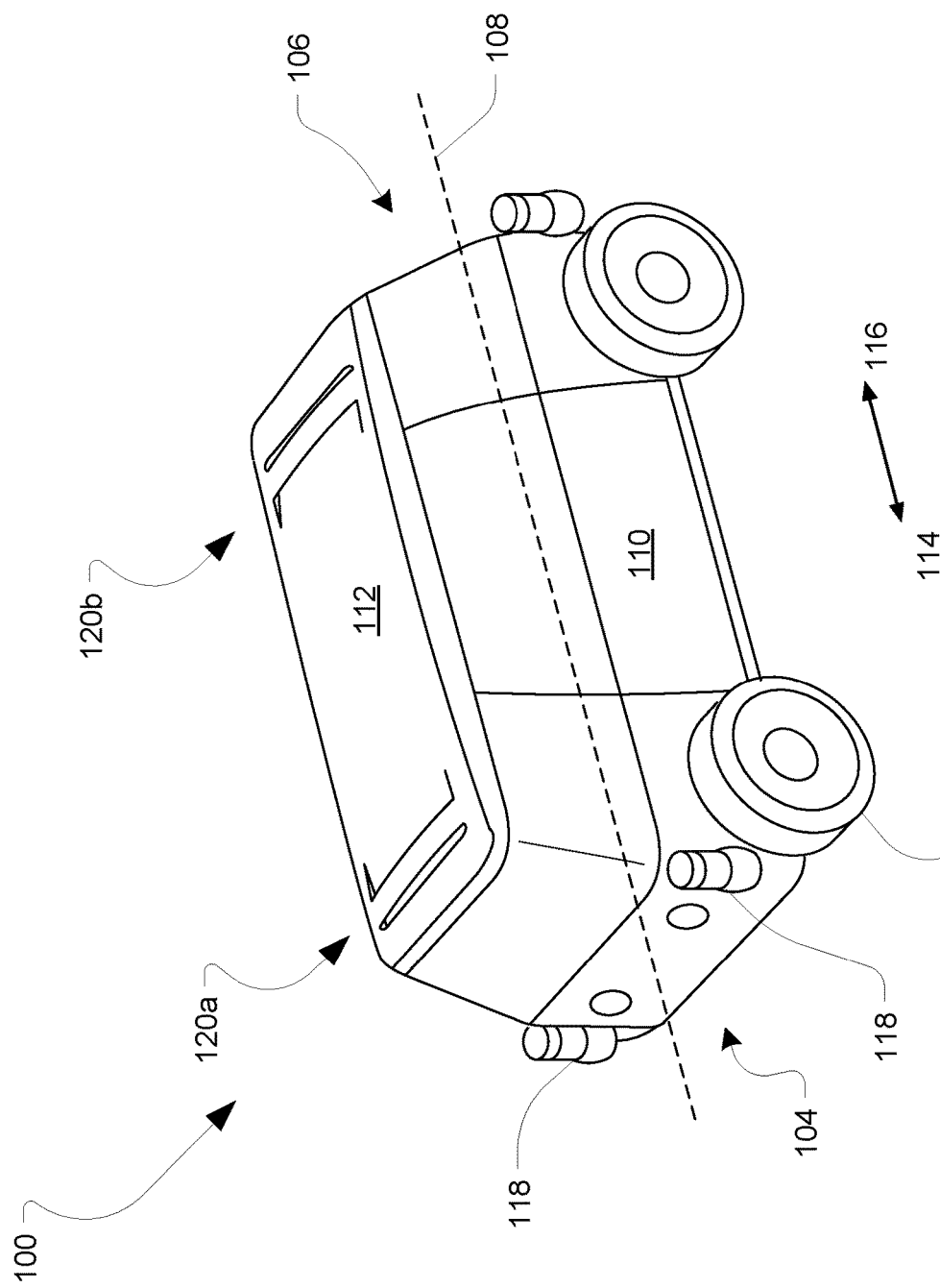
FIG. 1 is a perspective view of a vehicle, such as a bi-directional autonomous vehicle, according to implementations of this disclosure.

The following detailed description is directed to aerodynamic vehicle design, and more particularly to a spoiler or a spoiler arrangement that may impart desirable performance characteristics to a vehicle regardless of the direction of travel of the vehicle.

As a brief example, some vehicles may have bi-directional functionality, e.g., they may be configured to move forward in each of opposite directions. However, conventional aerodynamic designs and techniques are generally optimized for travel in a single direction. For example, a conventional spoiler projects from a trailing end of a vehicle to alter airflow as it passes the vehicle, e.g., to decrease drag. But, when that vehicle travels in reverse, such that the spoiler is at a leading end of the vehicle, the spoiler increases drag, which is undesirable. Thus, bi-directional vehicles are often designed to achieve a same drag coefficient regardless of forward direction, for example, by having a longitudinally-symmetrical outer surface. Minimizing a drag coefficient of these designs has conventionally been challenging, however, because they do not make use of the conventional unidirectional drag-reducing aerodynamic techniques and features.

According to implementations of this disclosure, however, a vehicle spoiler arrangement is described that may decrease the drag coefficient of the vehicle (relative to the vehicle without the spoiler arrangement) when the vehicle travels in a first direction, and when the vehicle travels in the opposite, second direction. For example, a first spoiler may be disposed proximate a first end of a vehicle and a second spoiler may be disposed proximate a second end of the vehicle. When the first end of the vehicle is a leading, or front end during travel, the first spoiler may promote laminar, attached airflow proximate the leading end, whereas the second spoiler may promote detachment of airflow at the trailing end, thereby reducing drag. Similarly, when the second end of the vehicle is the leading, or front end during travel, the second spoiler may promote laminar, attached airflow proximate the leading end, whereas the first spoiler may promote detachment of airflow at the trailing end, thereby reducing drag.

In some examples, a vehicle according to implementations of this disclosure may include a body and a spoiler incorporated in the body. The body may have an outer surface including a top surface transitioning to an adjoining surface extending generally downwardly relative to the top surface. For example, the top surface may be a roof or other upwardly-facing surface and the adjoining surface may be an end of the vehicle. The spoiler may include an indentation in the outer surface proximate a leading end or trailing end of the top surface, e.g., proximate a transition from the top surface to the adjoining surface, and a foil at least partially disposed in the indentation and extending laterally between the opposite indentation sides.

In some implementations of this disclosure, the spoiler may be configured to promote attached, laminar airflow when the spoiler is at a leading end of the vehicle, and to promote detachment of the airflow when the spoiler is at the trailing end of the vehicle. Moreover, in some implementations, the vehicle may be a bi-directional vehicle, configured to move forward in each of opposite directions. In these embodiments, two spoilers may be provided proximate opposite ends of the vehicle and rotated 180-degrees relative to each other. In this manner, regardless of the direction of travel, the leading spoiler will promote the attached, laminar airflow and the trailing spoiler will promote airflow detachment.

The techniques and systems described herein may be implemented in a number of ways. Example implementations are provided below with reference to the figures.

FIG. 1 shows an example vehicle 100 configured to move in an environment. The vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 100 may be powered by one or more internal combustion engines, one or more electric motors, hydrogen power, any combination thereof, and/or any other suitable power source(s). The example vehicle 100 is illustrated as including four wheels 102 upon which the vehicle 100 travels. However, the systems and methods described herein may be incorporated into vehicles having fewer or a greater number of wheels, tires, and/or tracks. In the illustrated example, the vehicle 100 includes a body generally including a first end 104 and a second end 106 spaced from the first end 104 along a longitudinal axis 108 of the vehicle 100. The vehicle 100 body also includes opposite sides 110 and a roof 112 Although a certain body styling is illustrated, the example vehicle 100 may be any configuration of vehicle, such as, for example, a van, a sport utility vehicle, a cross-over vehicle, a truck, a bus, an agricultural vehicle, and a construction vehicle.

The example vehicle 100 may have four-wheel steering and may operate generally with equal performance characteristics in all directions. For example, the vehicle 100 may be a bi-directional vehicle configured to move such that either the first end 104 or the second end 106 may be a front end of the vehicle 100. With specific reference to FIG. 1, the first end 104 of the vehicle 100 is the front or leading end of the vehicle 100 and the second end 106 of the vehicle 100 is the rear or trailing end when the vehicle travels in a first direction 114. Similarly, the second end 106 of the vehicle 100 is the front or leading end of the vehicle 100 and the first end 104 of the vehicle 100 is the rear or trailing end when the vehicle travels in a second direction 116 opposite the first direction 114. These example characteristics may facilitate greater maneuverability, for example, in small spaces or crowded environments, such as parking lots and urban areas, and may also facilitate continued operation of the vehicle under certain circumstances, e.g., in the event of failure of some functionality of the vehicle 100. Moreover, and in conjunction with the bi-directional functionality, the first end 104 and the second end 106 may be largely identical. For example, in some implementations including the illustrated example, the vehicle may be substantially longitudinally symmetrical, i.e., about a plane to which the longitudinal axis 108 is normal.

The vehicle 100 may travel through an environment, relying at least in part on sensor data indicative of objects in the environment in order to determine trajectories of the vehicle 100. For example, as the vehicle 100 travels through the environment, one or more sensors 118 may be configured to capture data associated with detected objects (e.g., other vehicles, pedestrians, buildings, barriers, etc.). The data captured may be used, for example, as input for determining trajectories for the vehicle 100. In implementations of this disclosure, the sensors 118 may include, but are not limited to, image capture devices, LIDAR sensors, and/or other types of sensors. In some embodiments, the sensors 118 may not be necessary and/or can be omitted entirely.

As also illustrated in FIG. 1, the vehicle 100 includes a first spoiler 120a and a second spoiler 120b. The first spoiler 120a is arranged proximate the first end 104 of the vehicle 100 and the second spoiler 120b is arranged proximate the second end 106 of the vehicle 100. As will be detailed further below, the spoilers 120a, 120b may be configured to improve the aerodynamic characteristics of the vehicle 100 regardless of whether the vehicle 100 is traveling in the direction 114 or in the direction 116.

Figure 2A:
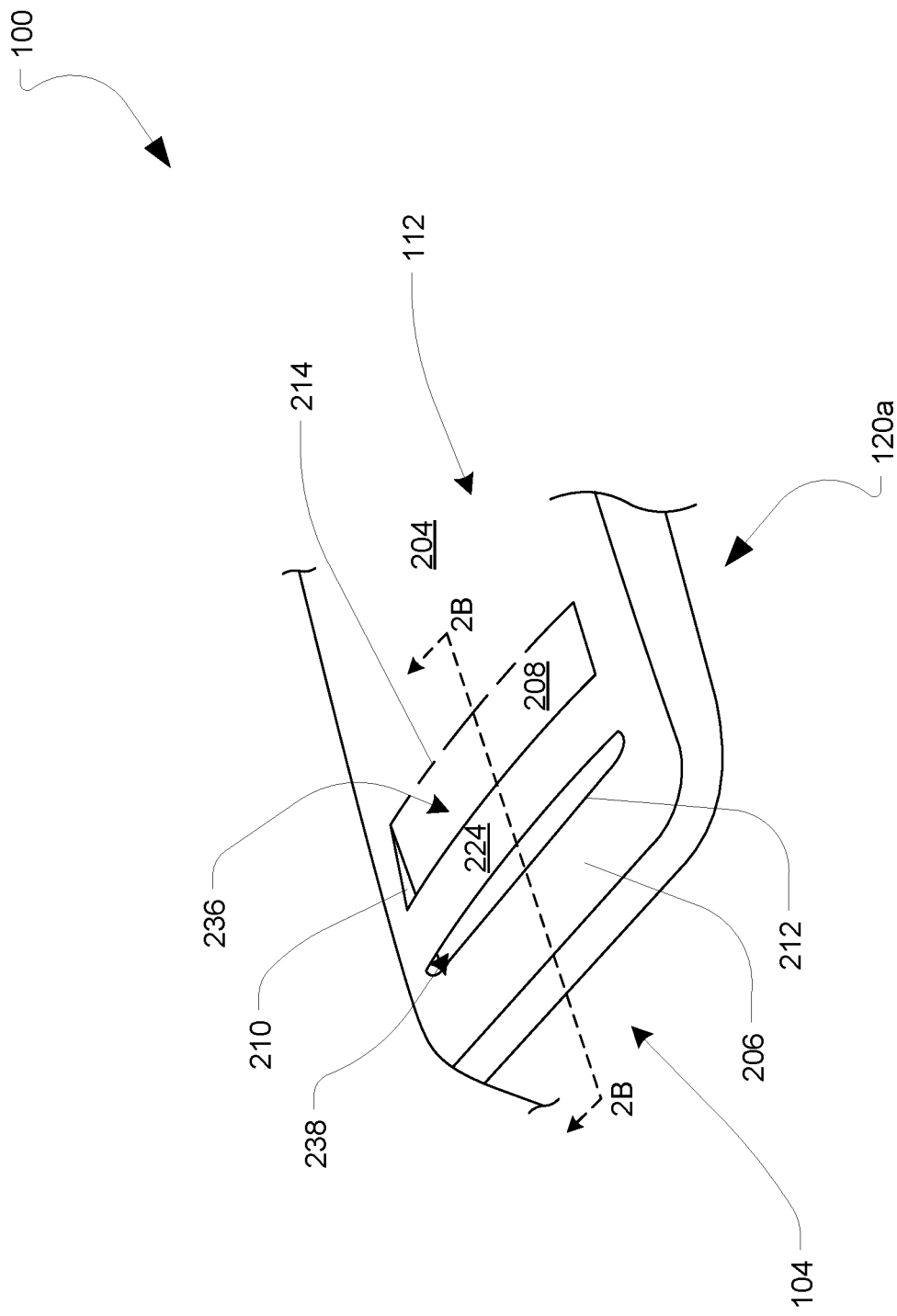
FIGS. 2A and 2B are, respectively, a partial perspective view of the vehicle illustrated in FIG. 1 and a cross-sectional view of the partial perspective view shown in FIG. 2A.
Figure 2B:
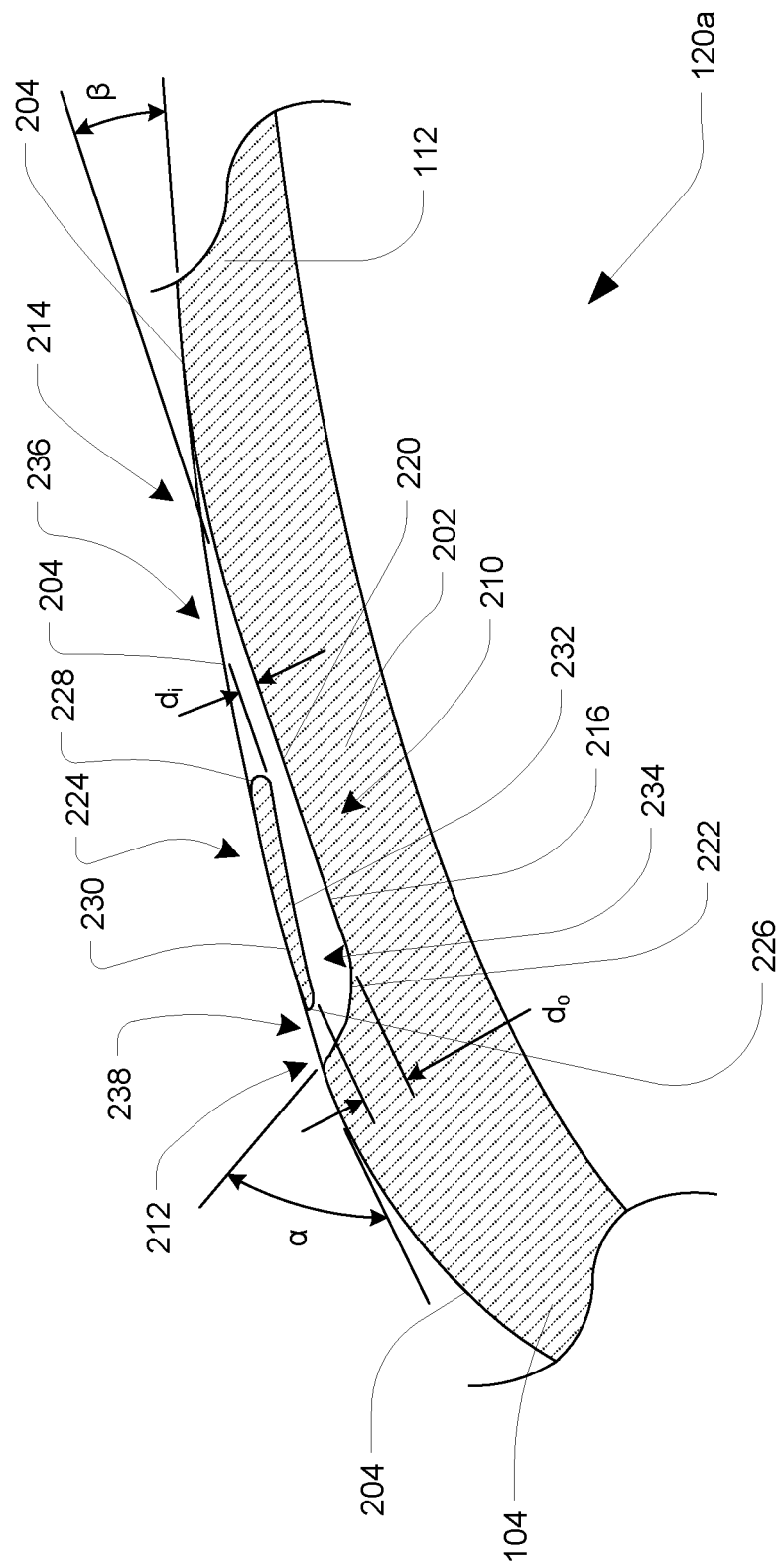

FIG. 2A is a partial perspective view illustrating the first spoiler 120a in more detail, and FIG. 2B is a partial cross-sectional view of the first spoiler 120a taken along section line 2B-2B in FIG. 2A. FIGS. 2A and 2B will be described in detail to illustrate examples of the spoiler 120a. As will be appreciated, the second spoiler 120b may be substantially identical to the first spoiler 120a, for example, differing only in placement (e.g., proximate the second end 106) and orientation (e.g., rotated 180-degrees to maintain longitudinal symmetry of the vehicle 100). Thus, the features discussed with regard to FIGS. 2A and 2B as being features of the first spoiler 120a also may be features of the second spoiler 120b.

As illustrated, the spoiler 120a is incorporated in a body 202 of the vehicle 100. More specifically, the spoiler 120a may be formed proximate a transition 206 between the roof 112 and the first end 104, though any other location along the vehicle 100 is contemplated (as may be selected to optimize an aerodynamic effect as described herein). The body 202 generally includes an outer surface 204 which is configured as a substantially continuous surface extending along the roof 112 and the front end 104. In embodiments of this disclosure, the outer surface 204 may be generally convex (as viewed from the exterior of the vehicle 100), with the roof 112 being substantially horizontal and the first end 104 extending downwardly from the roof 112. In other embodiments, the body 202 may include other contours, shapes, and/or sizes; the illustrated arrangement is for example only. Regardless of the contour or shape of the vehicle, advantages of aspects of this disclosure may be realized by placing the spoiler 120a at or near a transition between a generally horizontal surface and a surface extending generally downwardly therefrom. As will also be appreciated from the disclosure herein, the position of the spoiler 120a on the outer surface 204 may influence functionality of the spoiler 120a. By way of non-limiting example, placement of the spoiler on a more horizontal surface or a more vertical surface will differently impact airflow interacting with the spoiler, e.g., by altering relative angles of surfaces of the spoiler 120a, including angles $\alpha$ and $\beta$, described below.

The spoiler includes a scoop or indentation 208 formed in the outer surface 204. As best illustrated in FIG. 2A, the indentation 208 is a concave feature having a cross-section approximating a tear drop (or half of a tear drop) viewed from one plane and a cross-section generally approximating a rectangle when viewed from another plane. More specifically, the indentation 208 extends laterally between opposite sides 210 (one of which is illustrated) and extends longitudinally between a first end 212 and a second end 214. Although the term "end" is used herein to describe the longitudinal extents of the indentation 208, as illustrated in FIG. 2B, the first end 212 and the second end 214 may be transitional surfaces that facilitate transitions between the outer surface 204 and a concave surface 216 forming the inner surface of the indentation 208. By way of non-limiting example, the first end 212 and the second end 214 may include one or more arcuate transitions, e.g., radiuses. FIG. 2B best illustrates details of the concave surface 216. Specifically, the concave surface 216 generally includes a first surface 218 extending from the first end 212 and a second surface 220 extending from the second end 214. The first surface 218 and the second surface 220 meet at a trough 222, which may be the deepest portion of the indentation 208. Thus, in the longitudinal direction and starting proximate the first end 104, the indentation 208 may include the first end 212, the first surface 218, the trough 222, the second surface 220, and the second end 214. Moreover, and as illustrated, each of the first end 212, the first surface 218, the trough 222, the second surface 220, and the second end 214 may extend laterally between the sides 210 of the indentation 208.

As noted above, the first end 212 generally provides a transition from the outer surface 204 to the first surface 218 proximate the first end 104 of the vehicle 100 and the second end 214 generally provides a transition from the outer surface 204 (e.g. at the roof 112) to the second surface 220. These transitions are necessary because the first surface 218 is angled relative to the outer surface proximate the first end 212 and because the second surface 220 is angled relative to the outer surface 204 proximate the second end 214. More specifically, and as illustrated in FIG. 2B, the first surface 218 is angled relative to the outer surface 204 by an angle α and the second surface 220 is angled relative to the outer surface 204 by an angle β. As will be described in more detail below, the first surface 218 may be intended to promote detachment of airflow from the vehicle, whereas the second surface 220 may be intended to facilitate attachment of airflow to the vehicle. The angles α and β may generally be any angles greater than zero-degrees and less than 90-degrees, and in some embodiments the angle α may be larger than the angle β. For instance, the angle α may be between about 10-degrees and about 90-degrees, and the angle β may be between about 5-degrees and about 30-degrees. As will be appreciated, although the angles α and β are generally described herein as being between surfaces, in implementations of this disclosure the outer surface 204, the first surface 218 and/or the second surface 220 may include contoured or non-linear surfaces. Accordingly, the angles α and β may be measured between lines that are tangential to or otherwise representative of the respective surfaces. However, the functionality of the respective surfaces, described in more detail below, may be of particular importance, and it is anticipated that this functionality may be achieved using a range of angles.

The spoiler 120a also includes a foil 224 disposed in the indentation 208. Specifically, the foil 224 generally extends laterally between the sides 210 of the indentation 208 but is spaced from the indentation 208 between the sides 210. More specifically, the foil 224 is illustrated as including a first end 226, a second end 228 spaced from the first end 226 in the longitudinal direction, a top surface 230, and a bottom surface 232. The top surface 230 and the bottom surface 232 are spaced from each other, and each extends between the first end 226 and the second end 228. In implementations of this disclosure, the first end 226 of the foil 224 is generally disposed to face the first end 212 and/or the first surface 218 of the indentation 208, the bottom surface 232 of the foil 224 is arranged to face the concave surface 216, and the second end 228 of the foil 224 is generally disposed to face the second 214 and/or the second surface 218 of the indentation 208. According to this arrangement, a void or passageway 234 is formed between the foil 228 and the indentation 208. The passageway may include, for example, an inlet 236 between the second end 228 of the foil 224 and the second end 214 of the indentation 208 and an outlet 238 between the first end 226 of the foil 224 and the first end 212 of the indentation 208.

As illustrated in FIG. 2B, the top surface 230 and the bottom surface 232 of the foil 224 are angled relative to each. More specifically, proximate the first end 226 the top surface 230 and the bottom surface 232 are relatively closer to each other than at the second end 228. Accordingly, the foil 224 is relatively wider at the inlet 236, which may promote detachment of the airflow, as detailed further below. Depending upon the desired airflow characteristics, the foil may take different shapes. For example, the foil 224 may be relatively wider at the first end 226 than at the second end 224. The top and bottom surfaces 230, 232 may alternatively be substantially parallel. In still further examples, the top surface 230 and/or the bottom surface 232 may be arcuate surfaces. For example, though depicted in FIG. 2b as a wedge for illustrative purposes, any other shape is contemplated which provides a narrower passage in proximity with the second end 214 and a larger passage for airflow near the first end 212 (e.g. tear drop, wedge, etc.).

The foil 224 may also be configured such that the top surface 230 is a contoured surface. As illustrated, the top surface 230 has a slight convex shape. In implementations of this disclosure, the top surface 230 of the of the foil 224 may be contoured generally to match a contour of the outer surface 204 of the body 202 proximate the indentation 208. For instance, the contour of the top surface 230 of the foil 224 may closely approximate a contour of the outer surface 204 of the body 202 at the lateral sides 210 of the indentation 208, at the first end 212 of the indentation 208, and/or at the second end 214 of the indentation 208. In other implementations, the top surface 230 of the foil 224 may be configured to approximate a shape of the outer surface 204 of the body at the location of the foil 224, if the spoiler 120a was not present in the outer surface.

As also illustrated in FIG. 2B, dimensions of the passageway may vary along the longitudinal direction. For example, the second end 228 of the foil 224 may be spaced from the indentation 208, e.g., from the concave surface 216. This distance is illustrated as do in FIG. 2B. Moreover, the first end 226 of the foil 208 may be spaced from the indentation 208, e.g., from the concave surface 216. This distance is illustrated as $d_i$ in FIG. 2B. As also illustrated, $d_i$ may be less than $d_2$, such that foil 224 is farther from the indentation 208 proximate the front end 218 of the foil 224 than proximate the second end. In this manner, the passageway 208 may serve as an expansion chamber. Moreover, $d_i$ and do may be altered, depending upon the desired characteristics. For example, do may be between about 1 and about 20 times larger than $d_i$. As will be appreciated, flow characteristics, discussed in more detail below, may be influenced by adjusting the relative position and spacing of the foil relative to the indentation.

As illustrated in FIG. 2A, the indentation 208 and the foil 224 have a lateral width, i.e., a distance between the lateral sides 210. In the illustrated embodiments, the lateral sides 210 are near sides of the vehicle, but the lateral width may be different in alternate embodiments. For example, the spoiler may be relatively narrower or relatively wider. In some instances, the sides 210 of the spoiler 208 may actually be formed on sides 110 of the vehicle 100. Further, in some examples, the indentation 208 and/or foil 224 may taper such that one side is wider than a second side. Additionally, or alternatively, sizes of the inlet 236 and the outlet 238 may be sized to optimize for laminar flow when traveling in one direction and detachment when traveling in the other.

FIGS. 3A and 3B are partial cut-away, cross-sections of the vehicle 100, and more specifically, of the first spoiler 120a and the second spoiler 120b. The second spoiler 120b is substantially identical to the first spoiler 120b, and accordingly the same features are denoted by the same reference numerals used in FIGS. 2A and 2B. The only major differences between the first spoiler 120a and the second spoiler 120b may be the position and orientation. Specifically, as illustrated in FIGS. 1, 3A and 3B, the first spoiler 120a is disposed proximate the first end 104 of the vehicle 100 and the second spoiler 120b is disposed proximate the second end 106 of the vehicle 100. Moreover, the first spoiler 120b rotated 180-degrees relative to the first spoiler 120a. In accordance with this arrangement, the vehicle 100 is substantially symmetrical about a plane through the longitudinal center of the vehicle 100 to which the longitudinal axis 108 is normal. In the first scenario 300a, the vehicle is travelling in a first direction 302, which may be the same as direction 114 in FIG. 1, and in the second scenario 300b, the vehicle is travelling in a second direction 304, which may be the same as the direction 116 in FIG. 1. Though depicted in FIGS. 3A and 3B as substantially symmetric (i.e. within tolerances) for illustrative purposes, the two spoilers need not be. For example, in those scenarios in which a vehicle may travel bi-directionally, but have an asymmetric chassis, each spoiler may be independently optimized to provide laminar flow when traveling in one direction and promote detachment while traveling in a reverse direction.

In the first scenario 300a, the first end 104 is the leading, or front, end, and thus the first spoiler 120a is arranged proximate the leading end. Because the second end 104 is the trailing end, the second spoiler 120b is proximate the trailing end. Also in FIG. 3A, arrows 306 are indicative of airflow at the first spoiler 120a and arrows 308 are indicative of airflow at the second spoiler 120b as the vehicle moves in the direction 302. The arrows 306, 308 show the impact of the respective first spoiler 120a and second spoiler 120b on the aerodynamics of the vehicle.

At the first spoiler 120a, the airflow is generally laminar and remains attached to the outer surface 204. To facilitate this attachment, the top surface 230 of the foil 224 may be contoured generally to match a contour of the outer surface 204 of the body 202 proximate the indentation 208. For instance, the contour of the top surface 230 of the foil 224 may closely approximate a contour of the outer surface 204 of the body 202 at the lateral sides 210 of the indentation 208, at the first end 212 of the indentation 208, and/or at the second end 214 of the indentation 208. In other implementations, the top surface 230 of the foil 224 may be configured to approximate a shape of the outer surface 204 of the body at the location of the foil 224, if the spoiler 120a was not present in the outer surface. As will be appreciated, in aspects of this disclosure, the spoiler 120a, when arranged proximate the leading end, may be configured to provide minimal disruption to or deviation from the flow characteristics that would occur without the spoiler. Other considerations may also promote this end. For example, the distance between the first end 212 of the scoop 208 and the first end 226 of the foil 224 may be minimized, e.g., to discourage passage of air into the passageway 234. Moreover, the relatively small angle at which the second surface 220 tapers from the outer surface 204 at the second end 214 of the indentation 208 may promote reattachment as the air passes over the second end 228 of the foil 224 and into the space between the second end 228 of the foil 224 and the second end 228 of the indentation 208.

While the first spoiler 120a, as the leading spoiler, may promote attachment of airflow, the second spoiler 120b may promote detachment. More specifically, as illustrated by the arrows 308, as airflows across the roof 112 toward the rear end 106, much of the airflow may remain attached to the body 202 at the second end 214 of the indentation 208. Thus, the airflow will enter the passageway 234 via the inlet 236, and remain attached to the concave surface 216. Once in the passageway 234, the airflow contacts the first surface 218 and eventually exits the passageway 234 via the outlet 238. Because of the relatively large angle α between the first surface 218 and the outer surface 204 adjacent the first surface 218, airflow exiting the passageway 234 via the outlet 238 may be directed away from the vehicle, thereby detaching from the vehicle 100. In addition to being forced away from the vehicle, the airflow exiting the outlet 238 may also interfere with airflow that did not enter the passageway 234, i.e., that passed along the top surface 230 of the foil 224. This interference may cause further detachment of the airflow. Moreover, the foil 224 itself may act to disrupt the laminar airflow.

Thus, as embodied in the scenario 300a in FIG. 3A, when the vehicle having the first spoiler 120a and the second spoiler 120b travels in the direction 302, the first spoiler 120a promotes attachment of airflow to the vehicle while the second spoiler 120b facilitates detachment of the same airflow. By retaining the laminar, attached flow at the leading, first end 104 of the vehicle, the first spoiler 120a may have a negligible impact on drag. However, by facilitating detachment at the trailing, second end 106, the spoiler 120b may reduce drag, e.g., by creating turbulent flow that is directed generally away from the vehicle.

In the scenario 300b, illustrated in FIG. 3B, the vehicle with the first spoiler 120a and the second spoiler 120b is travelling generally in the direction 304, which is opposite the direction 302. In this scenario, the second end 106 is the leading end and the first end 104 is the trailing end. Accordingly, the first spoiler 120a is associated with the trailing end and the second spoiler 120b is associated with the leading end. Airflow at the leading spoiler 120b is illustrated by arrows 310 and airflow at the trailing spoiler 120a is illustrated by arrows 312. As shown, the leading, second spoiler 120b has a negligible impact on the attached, laminar flow proximate the leading end 106, whereas the trailing, first spoiler 120a promotes detachment of airflow at the trailing end 104. In effect, the spoilers 120a, 120b have the same overall effect on drag regardless of the direction of travel. This result is achieved because the spoilers 120a, 120b have the same structure, but are rotated 180-degrees relative to each other, thereby making the vehicle substantially longitudinally symmetrical.

Figure 4:
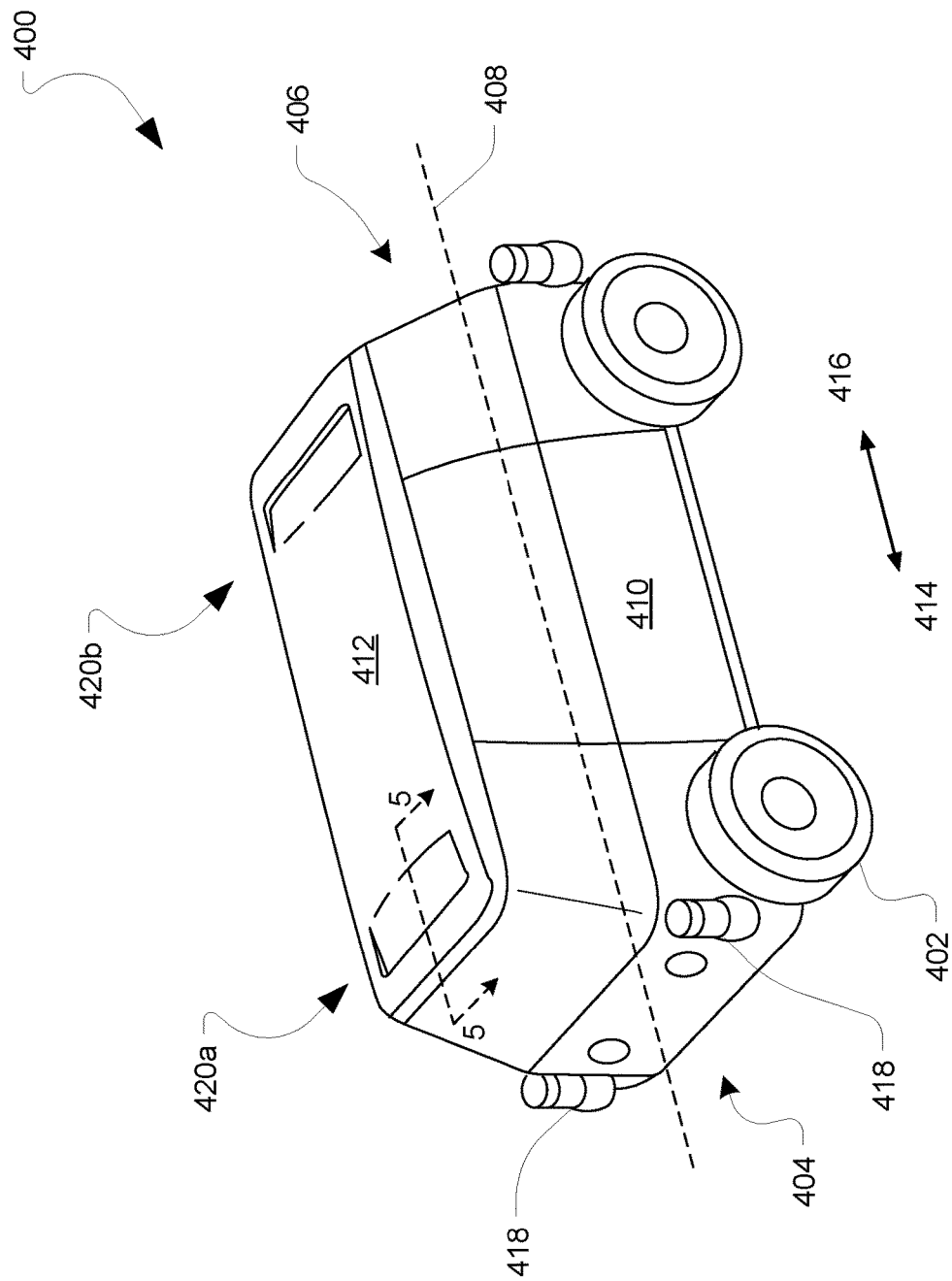
FIG. 4 is a perspective view of a vehicle, such as a bi-directional autonomous vehicle, according to additional implementations of this disclosure.

FIG. 4 illustrates another example embodiment of this disclosure. More specifically, FIG. 4 shows an example vehicle 400 configured to move in an environment. The vehicle 400 may be similar to or substantially the same as the vehicle 100 detailed above, and may include any and all features and functionality of the vehicle 100. For example, the vehicle 400 may be fully or partially autonomous.

The example vehicle 400 is illustrated as including four wheels 402 upon which the vehicle 400 travels. In the illustrated example, the vehicle 400 also includes a body generally having a first end 404 and a second end 406 spaced from the first end 404 along a longitudinal axis 408 of the vehicle 400. The vehicle 400 body also includes opposite sides 410 and a roof 412. Although a certain body styling is illustrated, the example vehicle 400 may be any configuration of vehicle, such as, for example, a van, a sport utility vehicle, a cross-over vehicle, a truck, a bus, an agricultural vehicle, and a construction vehicle.

Like the vehicle 100, the example vehicle 400 also may be a bi-directional vehicle configured to move such that either the first end 404 or the second end 406 may be a front end of the vehicle 400. With specific reference to FIG. 4, the first end 404 of the vehicle 400 is the front or leading end of the vehicle 400 and the second end 406 of the vehicle 400 is the rear or trailing end when the vehicle travels in a first direction 414. Similarly, the second end 406 of the vehicle 400 is the front or leading end of the vehicle 400 and the first end 404 of the vehicle 400 is the rear or trailing end when the vehicle travels in a second direction 416 opposite the first direction 414. To facilitate travel, the vehicle 400 may rely at least in part on sensor data indicative of objects in the environment. For example, as the vehicle 400 travels through the environment, one or more sensors 418 may be configured to capture data associated with detected objects (e.g., other vehicles, pedestrians, buildings, barriers, etc.).

As also illustrated in FIG. 4, the vehicle 400 includes a first spoiler 420a and a second spoiler 420b. The first spoiler 420a is arranged proximate the first end 404 of the vehicle 400 and the second spoiler 420b is arranged proximate the second end 406 of the vehicle 400. As will be detailed further below, the spoilers 420a, 420b may be configured to improve the aerodynamic characteristics of the vehicle 400 regardless of whether the vehicle 400 is traveling in the first direction 414 or in the second direction 416.

Figure 5:
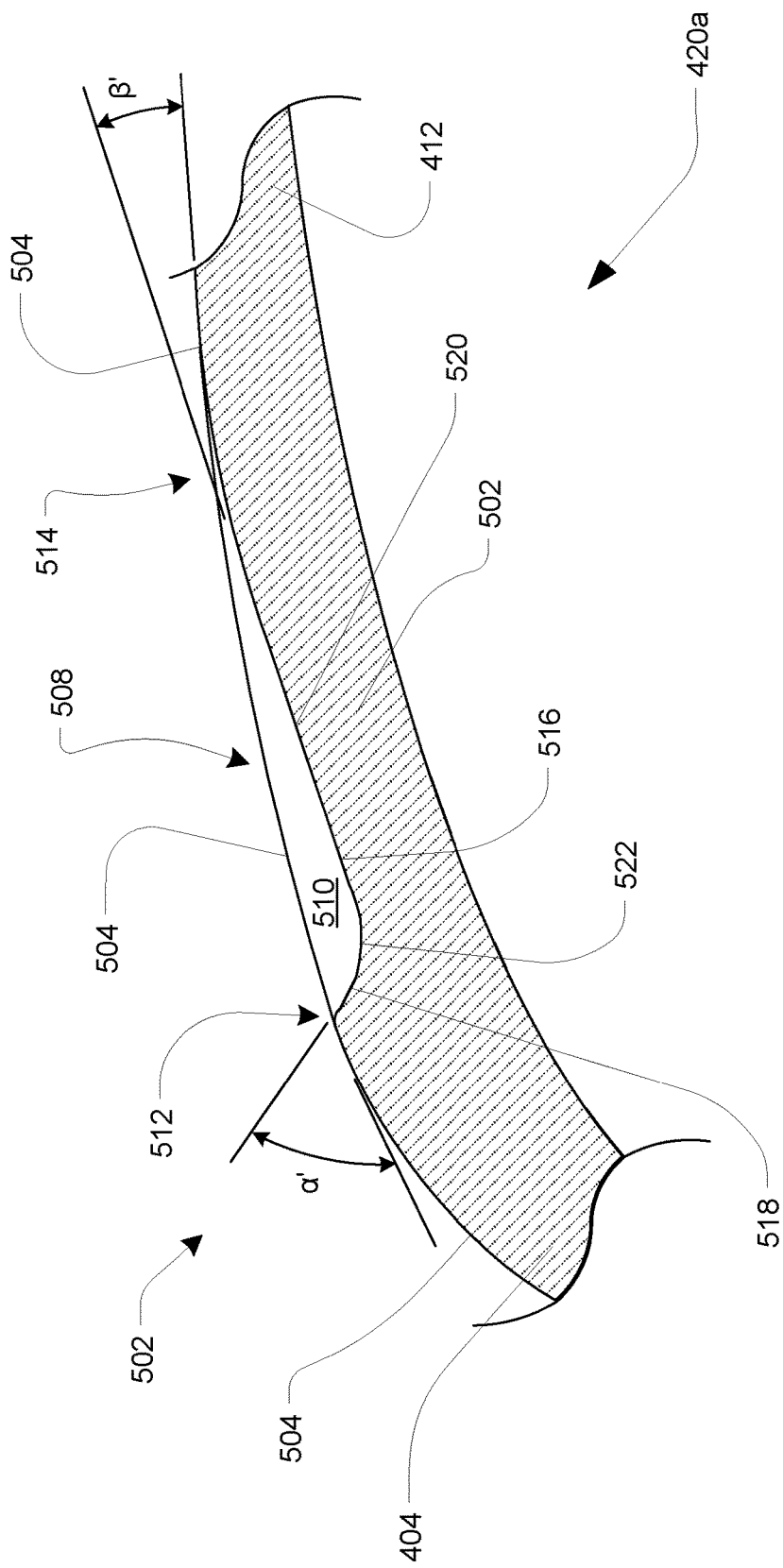
FIG. 5 is a partial cross-section view of the vehicle illustrated in FIG. 4, taken along the section line 5-5 in FIG. 4.

FIG. 5 a partial cross-sectional view of the first spoiler 420a taken along section line 5-5 in FIG. 4, and will be used to describe features of the spoiler 420a. As will be appreciated, the second spoiler 420b may be substantially identical to the first spoiler 420a, for example, differing only in placement (e.g., proximate the second end 406) and orientation (e.g., rotated 180-degrees to maintain longitudinal symmetry of the vehicle 400). Thus the features discussed with regard to FIG. 5 as being features of the first spoiler 420a also may be features of the second spoiler 420b.

As illustrated, the spoiler 420a is incorporated in a body 502 of the vehicle 400. More specifically, the spoiler 420a may be formed proximate a transition 504 between the roof 416 and the first end 404. In other embodiments, the spoiler 420a may be otherwise placed on the vehicle to optimize benefits described herein. The body 502 generally includes an outer surface 504 which is configured as a substantially continuous surface extending along the roof 416 and the front end 404. In embodiments of this disclosure, the outer surface 504 may be generally convex (as viewed from the exterior of the vehicle 400), with the roof 416 being substantially horizontal and the first end 404 extending downwardly from the roof 416 at the transition 504 between the roof 416 and the adjoining first end 404. As will be appreciated, the body 502 may take other contours, shapes, and/or sizes, and the illustrated arrangement is for example only. Regardless of the contour or shape of the vehicle, advantages of aspects of this disclosure may be realized by placing the spoiler 420a at a transition between a generally horizontal surface and a surface depending generally downwardly therefrom.

The spoiler includes a scoop or indentation 508 formed in the outer surface 504. As best illustrated in FIG. 4, the indentation 508 is a concave feature having a generally rectangular cross-sectional area when looking at the vehicle 400, though other shapes are contemplated (e.g. it may be advantageous to have a trapezoidal cross-section). More specifically, the indentation 508 extends laterally between opposite sides 510 (the surface of one of which is illustrated in the cut-away view) and extends longitudinally between a first end 512 and a second end 514. Although the term "end" is used herein to describe the longitudinal extents of the indentation 508, as illustrated in FIG. 5, the first end 512 and the second end 514 may be transitional surfaces that facilitate transitions between the outer surface 504 and a concave surface 516 comprising a bottom surface of the indentation 508. By way of non-limiting example, the first end 512 and the second end 514 may include one or more arcuate transitions, e.g., radiuses. FIG. 5 illustrates details of the concave surface 516. The concave surface 516 generally includes a first surface 518 extending from the first end 512 and a second surface 520 extending from the second end 514. The first surface 518 and the second surface 520 meet at a trough 522. Thus, in the longitudinal direction, the indentation 508 may include the first end 512, the first surface 518, the trough 522, the second surface 520, and the second end 514. Moreover, and as illustrated, each of the first end 512, the first surface 518, the trough 522, the second surface 520, and the second end 514 may extend laterally between the sides 210 of the indentation 508.

As noted above, the first end 512 generally includes a transition from the outer surface 504 to the first surface 518 proximate the first end 504 of the vehicle 400 and the second end 514 generally includes a transition from the outer surface 504 (e.g. at the roof 412) to the second surface 520. These transitions are necessary because the first surface 518 is angled relative to the outer surface proximate the first end 512 and because the second surface 520 is angled relative to the outer surface 504 proximate the second end 514. More specifically, and as illustrated in FIG. 5, the first surface 518 is angled relative to the outer surface 504 by an angle $\alpha'$ and the second surface 520 is angled relative to the outer surface 504 by an angle $\beta'$. As will be described in more detail below, the first surface 518 may promote detachment of airflow from the vehicle, whereas the second surface 520 may facilitate attachment of airflow to the vehicle. To these ends, the angle $\alpha'$ may be larger than the angle $\beta'$. For instance, the angle $\alpha'$ may be between about 45-degrees and about 90-degrees, and the angle $\beta'$ may be between about 5-degrees and about 30-degrees. As will be appreciated, although the angles $\alpha'$ and $\beta'$ are generally described herein as being between surfaces, in implementations of this disclosure the outer surface 504, the first surface 518 and/or the second surface 520 may include contoured and/or non-linear surfaces. Accordingly, the angles $\alpha'$ and $\beta'$ may be measured between lines that are tangential to or otherwise representative of the respective surfaces. However, the functionality of the respective surfaces, described in more detail below, may be of particular importance, and it is anticipated that this functionality may be achieved using a range of angles.

From the foregoing, it will be appreciated that the first spoiler 420a (and thus the second spoiler 420a) is similar to the first spoiler 120a (and thus the second spoiler 120b described above. However, unlike the first and second spoilers, 120a, 120b, the first and second spoilers 420a, 420b do not include a foil. In other respects, the spoilers may be substantially identical. By way of non-limiting example, the first spoiler 420a may be altered, modified, or augmented in accordance with any of the aspects and features discussed above with regard to the spoilers 120a, 120b.

Figure 6:
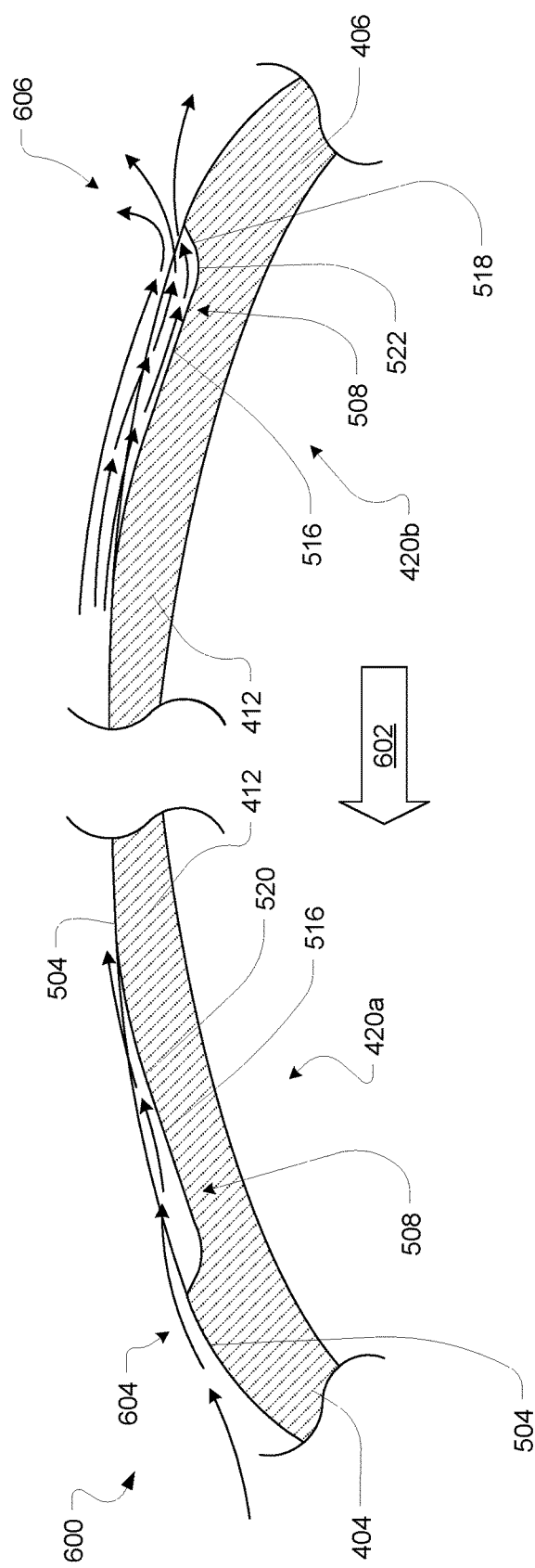
FIG. 6 is an example scenario showing airflow characteristics for the vehicle shown in FIG. 4 in implementations of this disclosure.

FIG. 6 is a partial cut-away, cross-section of the vehicle 400, used to illustrate a scenario 600 using the first spoiler 420a and the second spoiler 420b. The second spoiler 420b is substantially identical to the first spoiler 420a, and accordingly the same features are denoted by the same reference numerals used in FIGS. 4 and 5. The only major differences between the first spoiler 420a and the second spoiler 420b may be the position and orientation, as detailed above. In the scenario 600, the vehicle is travelling in a first direction 602, which may be the same as direction 414 in FIG. 4.

In the scenario 600, the first end 404 is the leading, or front, end, and thus the first spoiler 420a is arranged proximate the leading end. Because the second end 406 is the trailing end, the second spoiler 420b is proximate the trailing end. Also in 6, arrows 604 are indicative of airflow at the first spoiler 420a and arrows 606 are indicative of airflow at the second spoiler 420b as the vehicle moves in the direction 302. The arrows 306, 308 show the impact of the respective first spoiler 120*a* and second spoiler 120*b* on the aerodynamics of the vehicle.

At the first spoiler 420*a*, the airflow is generally laminar and remains attached to the outer surface 504. For instance, although the airflow may be slightly disrupted at the first end 512 of the indentation 508, the airflow promptly contacts the concave surface 516 forming the bottom of indentation 508 and reattaches to the body 502. For example, because the second surface 520 tapers from the outer surface 504 at the second end 514 of the indentation 508 at a relatively small angle ($\beta'$), the airflow sees a smooth transition from the indentation 508 to the outer surface 504 at the roof 412. This smooth transition promotes laminar airflow, with minimal detachment.

While the first spoiler 420*a*, as the leading spoiler, may promote attachment of airflow, the second spoiler 420*b* may promote detachment. More specifically, as illustrated by the arrows 606, as air flows across the roof 412 toward the rear end 406, much of the airflow may remain attached to the body 502 at the second end 514 of the indentation 508 of the second spoiler 420*b*. Thus, the airflow will follow the contour of the concave surface 516. As the airflow proceeds through the indentation 508, the airflow contacts the first surface 518 and eventually exits the indentation 508 at the first end 512. Because of the relatively large angle ($\alpha'$) between the first surface 518 and the outer surface 504 at the first end 526 of the indentation 508, airflow exiting may be directed away from the vehicle, thereby detaching from the vehicle 400. In addition to being forced away from the vehicle, the airflow may also interfere with airflow that did not enter the indentation 508, i.e., upper layers of the laminar airflow. This interference may cause further detachment of these upper layers.

Thus, as embodied in the scenario 600, when the vehicle having the first spoiler 420*a* and the second spoiler 420*b* travels in the direction 602, the first spoiler 420*a* promotes attachment of airflow to the vehicle while the second spoiler 420*b* facilitates detachment of the same airflow. By retaining the laminar, attached flow at the leading, first end 104 of the vehicle, the first spoiler 120*a* may have a negligible impact on drag. However, by facilitating detachment at the trailing, second end 106, the spoiler 120*b* may reduce drag, e.g., by creating turbulent flow that is directed generally away from the vehicle.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and components are disclosed as exemplary forms of implementing the claims.

Example Clauses

A: An example vehicle includes: a body having an outer surface, the outer surface comprising a top surface and an adjoining surface, the top surface and the adjoining surface extending between lateral sides of the vehicle; and a region of the body configured to alter a drag coefficient of the vehicle, the region comprising: an indentation in the outer surface proximate a transition from the top surface to the adjoining surface, the indentation comprising: a first indentation end proximate the transition, the first indentation end extending laterally between opposite indentation sides; a second indentation end spaced from the first indentation end, the second indentation end extending laterally between the opposite indentation sides; and an indentation surface extending between the first indentation end and the second indentation end, the indentation surface comprising a first surface extending from the first indentation end at a first angle relative to the outer surface, a second surface extending from the second indentation end at a second angle relative to the outer surface, and a trough disposed between the first surface and the second surface, each of the first surface, the second surface and the trough extending laterally between the opposite indentation sides; and a foil at least partially disposed in the indentation and extending laterally between the opposite indentation sides, the foil comprising a first foil end, a second foil end spaced from the first foil end, a top foil surface extending between the first foil end and the second foil end and a bottom foil surface spaced from the top foil surface and extending between the first foil end and the second foil end, wherein the first foil end and the second foil end are displaced between the first indentation end and the second indentation end, and the bottom foil surface is spaced from the indentation surface.

B: The vehicle of example A, wherein the vehicle is a bi-directional vehicle configured to go forward in a first direction in which a first longitudinal end of the vehicle is a leading end and a second longitudinal end opposite the first longitudinal end is a trailing end and to go forward in a second direction opposite the first direction, in which the first longitudinal end of the vehicle is a trailing end and the second longitudinal end of the vehicle is a leading end, wherein when the vehicle proceeds in the first direction, a majority of airflow across the spoiler flows over a top surface of the spoiler, and wherein when the vehicle proceeds in the second direction, at least a portion of airflow across the spoiler flows into a passageway between the foil and the indentation and is detached from the body upon exiting the passageway.

C: The vehicle of example A or example B, wherein the spoiler is a first spoiler disposed proximate the first longitudinal end of the vehicle and having a first orientation, the vehicle further comprising: a second spoiler disposed on the body proximate the second longitudinal end of the vehicle, the second spoiler being substantially identical to the first spoiler and having a second orientation rotated 180-degrees from the first orientation, wherein when the vehicle proceeds in the first direction, the second spoiler disrupts the flow of air over the second spoiler by causing the airflow to detach from the body, and wherein when the vehicle proceeds in the second direction, airflow over the second spoiler remains substantially laminar.

D: The vehicle of any one of example A through example C, wherein the outer surface has a substantially continuous curvature on opposite sides of the indentation and the top foil surface has a curvature that substantially matches the substantially continuous curvature.

E: The vehicle of any one of example A through example D, wherein: a distance between the indentation surface and the bottom foil surface proximate the first end of the foil is a first distance, a distance between the indentation surface and the bottom foil surface proximate the second end of the foil is a second distance, and the first distance is greater than the second distance.

F: The vehicle of any one of example A through example E, wherein the first indentation surface is at an angle α relative to the outer surface of the vehicle adjacent the first indentation end, the angle α being equal to or greater than about 45-degrees.

G: The vehicle of any one of example A through example F, wherein the second indentation surface is disposed at an angle β relative to the outer surface of the vehicle adjacent the second indentation end, the angle β being equal to or less than about 15-degrees.

H: The vehicle of any one of example A through example G, wherein a first distance is defined between the first indentation end and the first end and the first foil end, and a second distance is defined between the second indentation end and the second, the first distance being smaller than the second distance.

I: An example feature for a vehicle that alters aerodynamic properties associated with the vehicle, the feature comprising: an indentation in a top surface of the vehicle, the indentation comprising laterally-spaced indentation sides, a first indentation end proximate a longitudinal end of the vehicle, a second indentation end spaced from the first indentation end in a direction away from the longitudinal end of the vehicle, and a concave surface between the first indentation end and the second indentation end, the first indentation end, the second indentation end and the concave surface extending laterally between the indentation sides; and a foil disposed at least partially in the indentation, the foil extending between the indentation sides and spaced from the first indentation end, the concave surface, and the second indentation end to form a passageway between the foil and the indentation, wherein when the longitudinal end of the vehicle is a leading end of the vehicle, air substantially flows over the top surface of the foil, and wherein when the longitudinal end of the vehicle is a trailing end of the vehicle, air enters the passageway proximate the second indentation end and exits the passageway proximate the first indentation end to promote detachment of airflow proximate the longitudinal end.

J: The feature of example I, wherein the foil comprises: a first foil end, the first foil end proximate the first indentation end, a second foil end spaced from the first foil end and proximate the second indentation end, a top foil surface extending between the first foil end and the second foil end, and a bottom foil surface spaced from the top foil surface and extending between the first foil end and the second foil end.

K: The feature of example I or example J, wherein: a distance between the indentation surface and the bottom foil surface proximate the first foil end is a first distance, a distance between the indentation surface and the bottom foil surface proximate the second foil end is a second distance, and the first distance is greater than the second distance.

L: The vehicle of any one of example I through example K, wherein the first indentation surface is disposed at an angle relative to the outer surface of the vehicle adjacent the first indentation end, the angle being equal to or greater than about 45-degrees.

M: The vehicle of any one of example I through example L, wherein the second indentation surface is disposed at an angle relative to the outer surface of the vehicle adjacent the second indentation end, the angle being equal to or less than about 15-degrees.

N: The vehicle of any one of example I through example M, wherein an upper surface of the foil has a curvature that substantially matches a curvature of the surface of the vehicle on opposite sides of the indentation.

O: A vehicle comprising: a body having an outer surface, the outer surface comprising a top surface and an adjoining surface, the top surface and the adjoining surface extending between lateral sides of the vehicle; and an indentation in the outer surface proximate a first side of the vehicle, the indentation comprising: a first end proximate the first side of the vehicle extending laterally between lateral sides of the indentation; a second end spaced closer to a second side of the vehicle than the first end; and a generally concave surface extending between the first end and the second end, the concave surface comprising a first surface extending from the first end at a first angle relative to the outer surface, a second surface extending from the second end at a second angle relative to the outer surface, and a trough disposed between the first surface and the second surface, wherein the first angle is larger than the second angle, wherein, when the vehicle travels in a first direction in which the first end of the indentation is a leading end, airflow over the indentation is generally undisturbed, and wherein, when the vehicle travels in a second direction opposite the first direction, airflow over the indentation contacts the first surface causing the airflow to at least partially detach from the outer surface.

P: The vehicle of example O, wherein the first angle is equal to or greater than about 45-degrees.

Q: The vehicle of example O or example P, wherein the second angle is equal to or less than about 15-degrees.

R: The vehicle of any one of example O through example Q, wherein the indentation is a first indentation, the vehicle further comprising a second indentation, the second indentation comprising: a third end proximate the second side of the vehicle extending laterally between lateral sides of the second indentation; a fourth end spaced closer to the first side of the vehicle than the second end; and a generally concave surface extending between the third end and the fourth end, the concave surface comprising a third surface extending from the third end at a third angle relative to the outer surface, a fourth surface extending from the fourth end at a fourth angle relative to the outer surface, and a trough disposed between the third surface and the fourth surface, wherein the third angle is larger than the fourth angle, wherein, when the vehicle travels in a first direction in which the third end of the second indentation is a trailing end, airflow over the second indentation contacts the third surface causing the airflow to at least partially detach from the outer surface, and wherein, when the vehicle travels in the second direction, airflow over the second indentation is generally undisturbed S: The vehicle of any one of example O through example Q, further comprising a foil disposed at least partially in the indentation.

T: The vehicle of any one of example O through example S, wherein the foil extends laterally between the opposite indentation sides, the foil comprising a first foil end, a second foil end spaced from the first foil end, a top foil surface extending between the first foil end and the second foil end and a bottom foil surface spaced from the top surface and extending between the first foil end and the second foil end.

What is claimed is:

1. A vehicle comprising:
    a body having an outer surface, the outer surface comprising a top surface and an adjoining surface, the top surface and the adjoining surface extending between lateral sides of the vehicle; and
    a region of the body configured to alter a drag coefficient of the vehicle, the region comprising:
        an indentation in the outer surface proximate a transition from the top surface to the adjoining surface, the indentation comprising:
            a first indentation end proximate the transition, the first indentation end extending laterally between opposite indentation sides;
            a second indentation end spaced from the first indentation end, the second indentation end extending laterally between the opposite indentation sides; and
            an indentation surface extending between the first indentation end and the second indentation end, the indentation surface comprising a first surface extending from the first indentation end at a first angle relative to the outer surface, a second surface extending from the second indentation end at a second angle relative to the outer surface, and a trough disposed between the first surface and the second surface, each of the first surface, the second surface and the trough extending laterally between the opposite indentation sides; and
            a foil at least partially disposed in the indentation and extending laterally between the opposite indentation sides, the foil comprising a first foil end, a second foil end spaced from the first foil end, a top foil surface extending between the first foil end and the second foil end and a bottom foil surface spaced from the top foil surface and extending between the first foil end and the second foil end,
            wherein the first foil end and the second foil end are displaced between the first indentation end and the second indentation end, and the bottom foil surface is spaced from the indentation surface.

2. The vehicle of claim 1, wherein the vehicle is a bi-directional vehicle configured to go forward in a first direction in which a first longitudinal end of the vehicle is a leading end and a second longitudinal end opposite the first longitudinal end is a trailing end and to go forward in a second direction opposite the first direction, in which the first longitudinal end of the vehicle is a trailing end and the second longitudinal end of the vehicle is a leading end,
    wherein when the vehicle proceeds in the first direction, a majority of airflow across the spoiler flows over a top surface of the spoiler, and
    wherein when the vehicle proceeds in the second direction, at least a portion of airflow across the spoiler flows into a passageway between the foil and the indentation and is detached from the body upon exiting the passageway.

3. The vehicle of claim 2, wherein the spoiler is a first spoiler disposed proximate the first longitudinal end of the vehicle and having a first orientation, the vehicle further comprising:
    a second spoiler disposed on the body proximate the second longitudinal end of the vehicle, the second spoiler being substantially identical to the first spoiler and having a second orientation rotated 180-degrees from the first orientation,
    wherein when the vehicle proceeds in the first direction, the second spoiler disrupts the flow of air over the second spoiler by causing the airflow to detach from the body, and
    wherein when the vehicle proceeds in the second direction, airflow over the second spoiler remains substantially laminar.

4. The vehicle of claim 1, wherein the outer surface has a substantially continuous curvature on opposite sides of the indentation and the top foil surface has a curvature that substantially matches the substantially continuous curvature.

5. The vehicle of claim 1, wherein:
    a distance between the indentation surface and the bottom foil surface proximate the first end of the foil is a first distance,
    a distance between the indentation surface and the bottom foil surface proximate the second end of the foil is a second distance, and
    the first distance is greater than the second distance.

6. The vehicle of claim 1, wherein the first indentation surface is at an angle α relative to the outer surface of the vehicle adjacent the first indentation end, the angle α being equal to or greater than about 45-degrees.

7. The vehicle of claim 1, wherein the second indentation surface is disposed at an angle β relative to the outer surface of the vehicle adjacent the second indentation end, the angle β being equal to or less than about 15-degrees.

8. The vehicle of claim 1, wherein a first distance is defined between the first indentation end and the first end and the first foil end, and a second distance is defined between the second indentation end and the second, the first distance being smaller than the second distance.

9. A feature for a vehicle that alters aerodynamic properties associated with the vehicle, the feature comprising:
an indentation in a top surface of the vehicle, the indentation comprising laterally-spaced indentation sides, a first indentation end proximate a longitudinal end of the vehicle, a second indentation end spaced from the first indentation end in a direction away from the longitudinal end of the vehicle, and a concave surface between the first indentation end and the second indentation end, the first indentation end, the second indentation end and the concave surface extending laterally between the indentation sides; and
a foil disposed at least partially in the indentation, the foil extending between the indentation sides and spaced from the first indentation end, the concave surface, and the second indentation end to form a passageway between the foil and the indentation,
wherein when the longitudinal end of the vehicle is a leading end of the vehicle, air substantially flows over the top surface of the foil, and
wherein when the longitudinal end of the vehicle is a trailing end of the vehicle, air enters the passageway proximate the second indentation end and exits the passageway proximate the first indentation end to promote detachment of airflow proximate the longitudinal end.

10. The feature of claim 9, wherein the foil comprises:
a first foil end, the first foil end proximate the first indentation end,
a second foil end spaced from the first foil end and proximate the second indentation end,
a top foil surface extending between the first foil end and the second foil end, and
a bottom foil surface spaced from the top foil surface and extending between the first foil end and the second foil end.

11. The feature of claim 10, wherein:
a distance between the indentation surface and the bottom foil surface proximate the first foil end is a first distance,
a distance between the indentation surface and the bottom foil surface proximate the second foil end is a second distance, and
the first distance is greater than the second distance.

12. The feature of claim 9, wherein the first indentation surface is disposed at an angle relative to the outer surface of the vehicle adjacent the first indentation end, the angle being equal to or greater than about 45-degrees.

13. The feature of claim 9, wherein the second indentation surface is disposed at an angle relative to the outer surface of the vehicle adjacent the second indentation end, the angle being equal to or less than about 15-degrees.

14. The feature of claim 9, wherein an upper surface of the foil has a curvature that substantially matches a curvature of the surface of the vehicle on opposite sides of the indentation.

15. A vehicle comprising:
a body having an outer surface, the outer surface comprising a top surface and an adjoining surface, the top surface and the adjoining surface extending between lateral sides of the vehicle; and
an indentation in the outer surface proximate a first side of the vehicle, the indentation comprising:
a first end proximate the first side of the vehicle extending laterally between lateral sides of the indentation;
a second end spaced closer to a second side of the vehicle than the first end; and
a generally concave surface extending between the first end and the second end, the concave surface comprising a first surface extending from the first end at a first angle relative to the outer surface, a second surface extending from the second end at a second angle relative to the outer surface, and a trough disposed between the first surface and the second surface, wherein the first angle is larger than the second angle,
wherein, when the vehicle travels in a first direction in which the first end of the indentation is a leading end, airflow over the indentation is generally undisturbed, and
wherein, when the vehicle travels in a second direction opposite the first direction, airflow over the indentation contacts the first surface causing the airflow to at least partially detach from the outer surface.

16. The vehicle of claim 15, wherein the first angle is equal to or greater than about 45-degrees.

17. The vehicle of claim 15, wherein the second angle is equal to or less than about 15-degrees.

18. The vehicle of claim 15, wherein the indentation is a first indentation, the vehicle further comprising a second indentation, the second indention comprising:
a third end proximate the second side of the vehicle extending laterally between lateral sides of the second indentation;
a fourth end spaced closer to the first side of the vehicle than the second end; and
a generally concave surface extending between the third end and the fourth end, the concave surface comprising a third surface extending from the third end at a third angle relative to the outer surface, a fourth surface extending from the fourth end at a fourth angle relative to the outer surface, and a trough disposed between the third surface and the fourth surface, wherein the third angle is larger than the fourth angle,
wherein, when the vehicle travels in a first direction in which the third end of the second indentation is a trailing end, airflow over the second indentation contacts the third surface causing the airflow to at least partially detach from the outer surface, and
wherein, when the vehicle travels in the second direction, airflow over the second indentation is generally undisturbed.

19. The vehicle of claim 15, further comprising a foil disposed at least partially in the indentation.

20. The vehicle of claim 19, wherein the foil extends laterally between the opposite indentation sides, the foil comprising a first foil end, a second foil end spaced from the first foil end, a top foil surface extending between the first foil end and the second foil end and a bottom foil surface spaced from the top surface and extending between the first foil end and the second foil end.

* * * * *